US00RE34103E

United States Patent [19]

Mabey et al.

[11] E Patent Number: Re. 34,103

[45] Reissued Date of Patent: Oct. 20, 1992

[54] LATTICE BRIDGES

[75] Inventors: Bevil G. Mabey, West Wittering; David G. Mabey, Wargrave, both of England

[73] Assignee: Mabey & Johnson Limited, Twyford, England

[21] Appl. No.: 438,755

[22] Filed: Nov. 17, 1989

Related U.S. Patent Documents

Reissue of:

[64] Patent No.: 4,706,436
Issued: Nov. 17, 1987
Appl. No.: 846,717
Filed: Apr. 1, 1986

[51] Int. Cl.[5] ..... E04H 12/18; E01D 9/00

[52] U.S. Cl. ..... 52/645; 14/2; 14/4; 52/174; 52/657; 52/693; 52/695

[58] Field of Search ..... 52/693, 645, 695, 657, 52/641; 14/2, 4

[56] References Cited

U.S. PATENT DOCUMENTS

| | | | |
|---|---|---|---|
| D. 227,086 | 6/1973 | Johnson | 52/695 |
| 2,126,844 | 8/1938 | Uecker et al. | 52/691 |
| 3,062,340 | 11/1962 | Hunnebeck | 52/641 X |
| 3,587,125 | 6/1971 | McLeese et al. | 14/6 |
| 4,706,436 | 11/1987 | Mabey et al. | 52/645 |

FOREIGN PATENT DOCUMENTS

| | | | |
|---|---|---|---|
| 951881 | 4/1949 | France | 52/693 |
| 511262 | 1/1959 | Italy | 52/641 |
| 553374 | 5/1943 | United Kingdom | 52/693 |
| 927917 | 6/1963 | United Kingdom . | |
| 1471991 | 4/1977 | United Kingdom | 14/4 |
| 2019925 | 11/1979 | United Kingdom | 14/4 |

*Primary Examiner*—David A. Scherbel
*Assistant Examiner*—Kien Nguyen
*Attorney, Agent, or Firm*—Leydig, Voit & Mayer

[57] ABSTRACT

A lattice bridge construction system is characterized by the provision of lattice panels (A,B,C) which are of substantially identical length but of different depths relative to one another such that when variously combined one with another, with or without additional reinforcement, trusses having considerably more economic increments of bending strength may be achieved.

10 Claims, 7 Drawing Sheets

LATTICE BRIDGES

Matter enclosed in heavy brackets [ ] appears in the original patent but forms no part of this reissue specification; matter printed in italics indicates the additions made by reissue.

The invention relates to lattice panel bridges of the kind first proposed in British Pat. No. 553374 (The Bailey Bridge). To date, all such equipment bridges have been based on the use of a multiplicity of panels of standard or identical length, depth and strength.

The present proposal is to produce panels of different sizes and strengths which [can] *could if desired* be assembled together in the same bridge. Whilst the panels are of identical length, [or fractions or multiples thereof,] they are of different depths and have chords whose members may be of alternative strengths. The resulting girders can therefore have more degrees of variation of strength, thus conforming more closely to the bending moment diagram requirements and utilising material with greater efficiency and economy.

The invention is described in further detail by reference to the accompanying drawings, in which.

Figure 1:
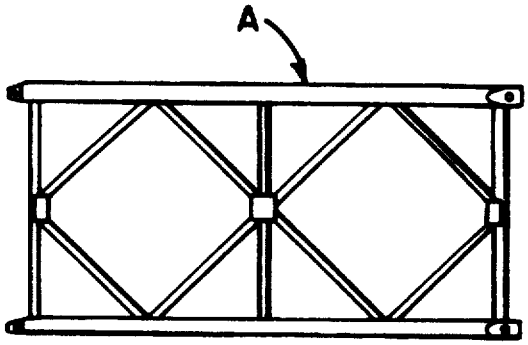
FIG. 1 is a side elevation of an existing standard form of lattice panel hereinafter referred to as Type 'A' panel.
Figure 1A:
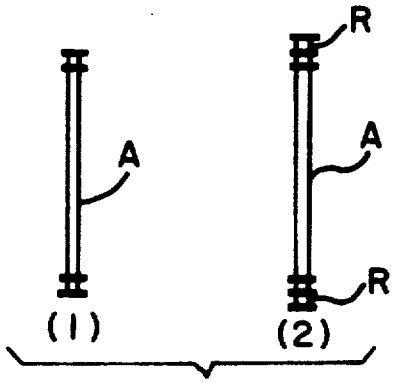
FIGS. 1A and 1B are diagrammatic end elevations of the panel shown in FIG. 1 and a variation and combination thereof.
Figure 1B:
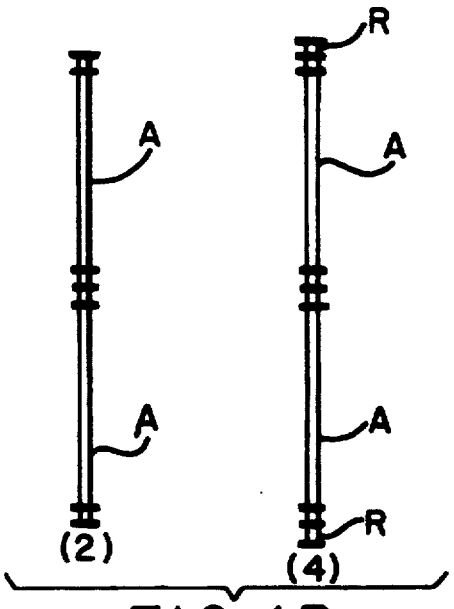
Figure 2B:
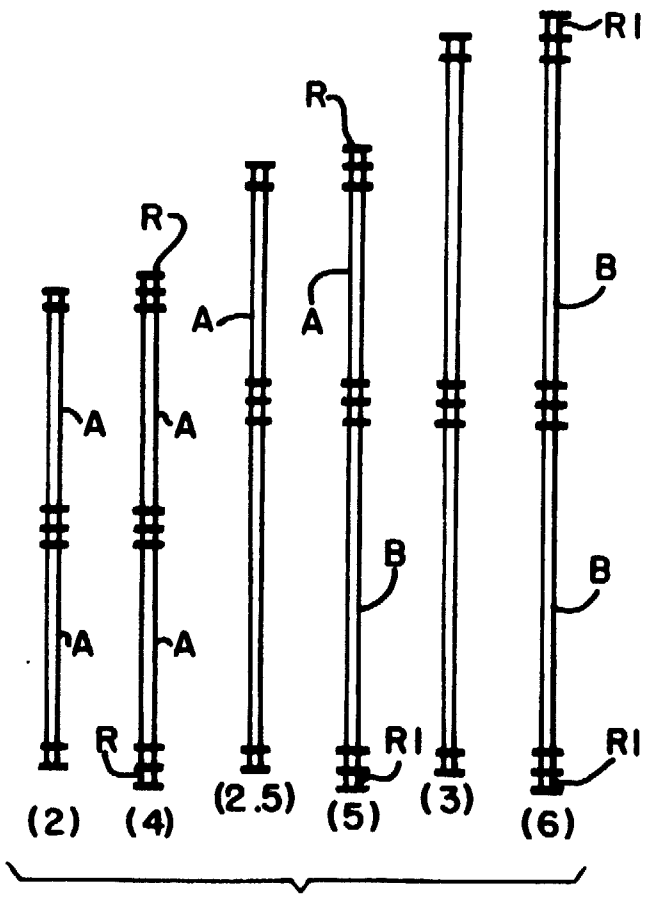
FIG. 2 is a side elevation of a second form of lattice panel hereinafter referred to as a Type 'B' panel.
Figure 2:
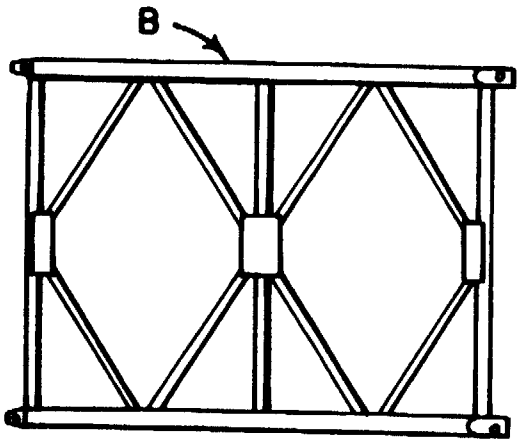
Figure 2A:
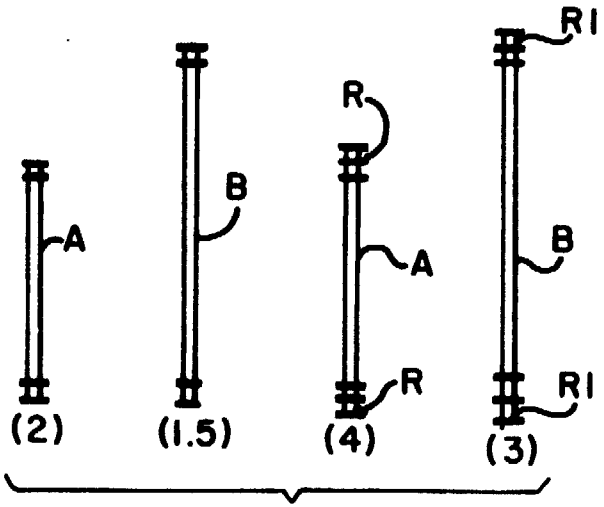
Figure 3:
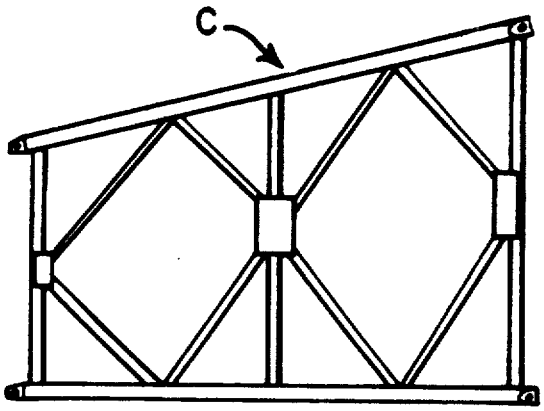
Figure 4:
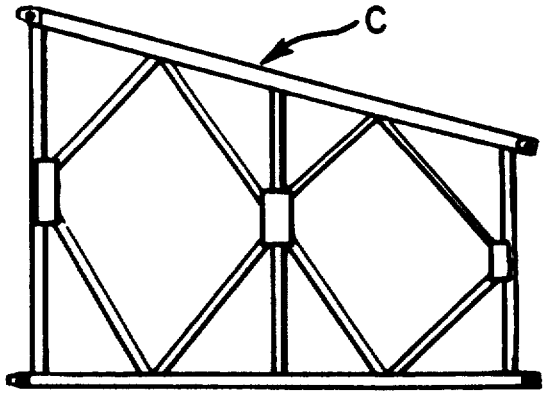
Figure 5:
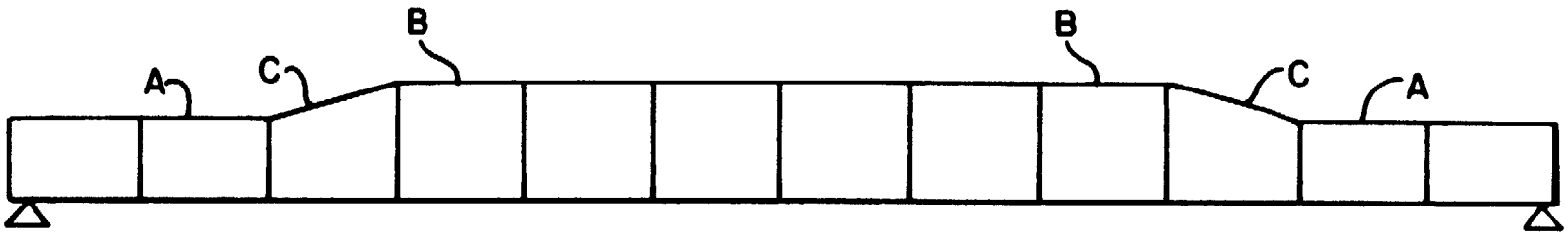
Figure 6:
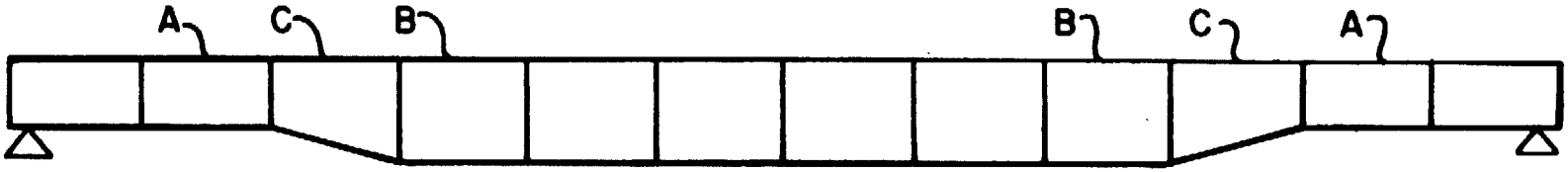

FIGS. 2A and 2B, analagous to FIGS. 1A and 1B, are diagrammatic end elevations of the panel shown in FIG. 2 and a variation and combination thereof with itself and with a panel as shown in FIGS. 1 and 1A;

FIGS. 3 and 4 illustrate a transition panel in alternative facing positions;

FIGS. 5 and 6 illustrate two modes of use of transition panels as shown in FIGS. 3 and 4.

Figure 7:
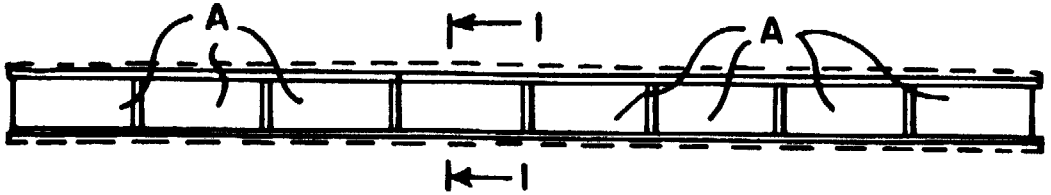
Figure 8:
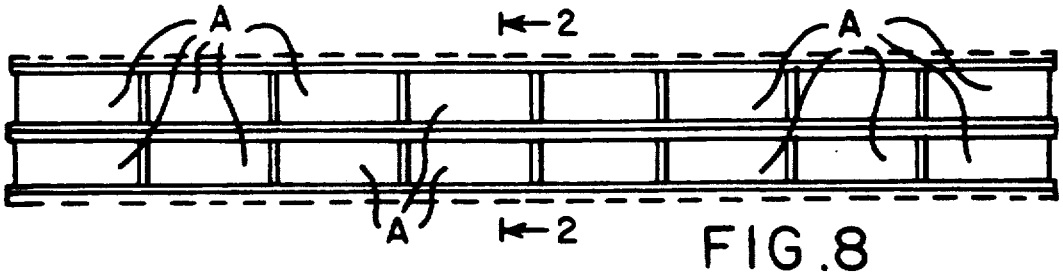
Figure 9:
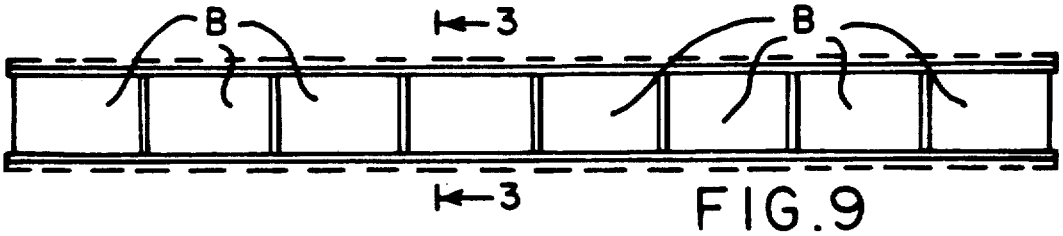
Figure 10:
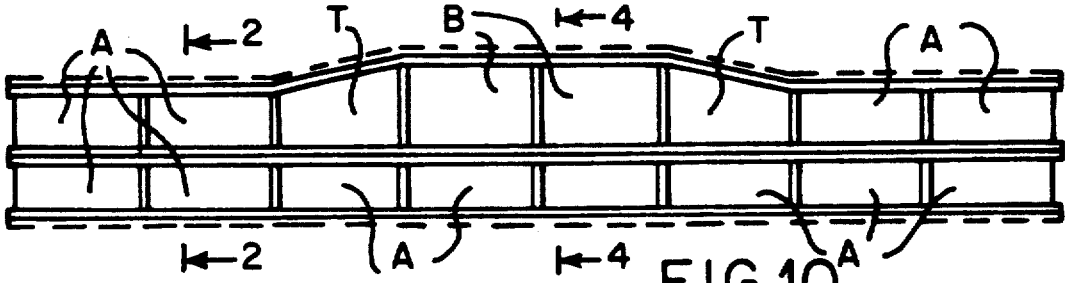
Figure 11:
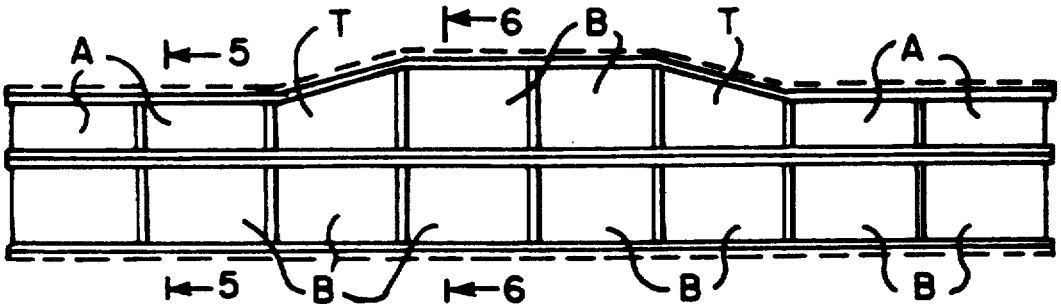
Figure 12:
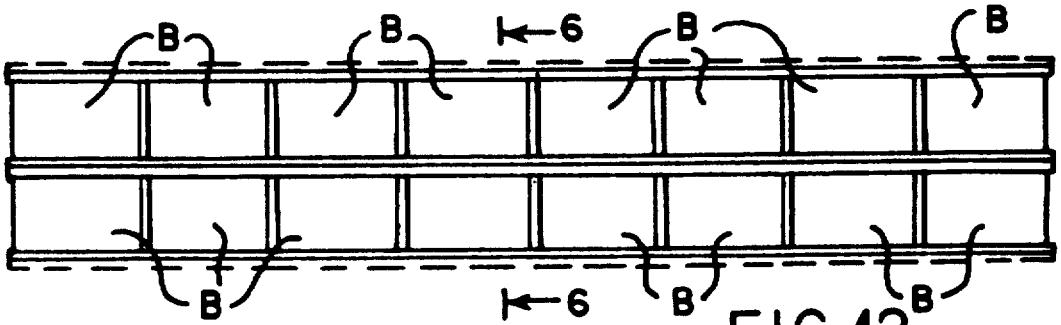
Figure 13:
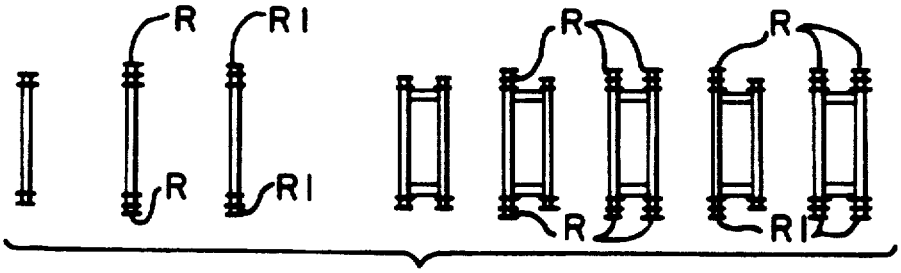
Figure 14:
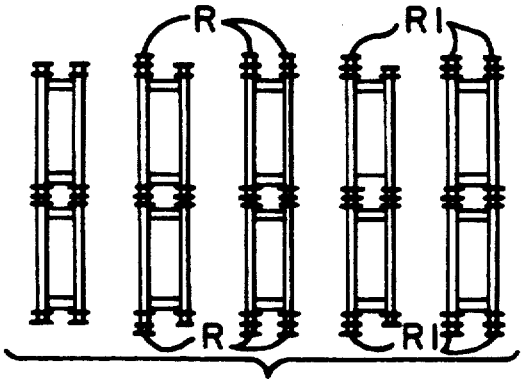
Figure 15:
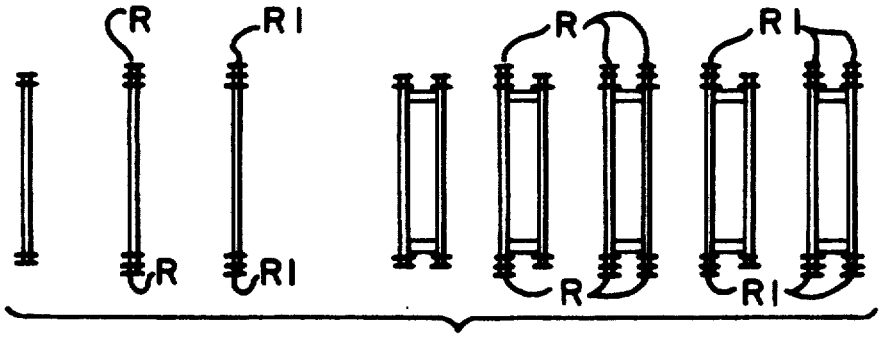
Figure 16:
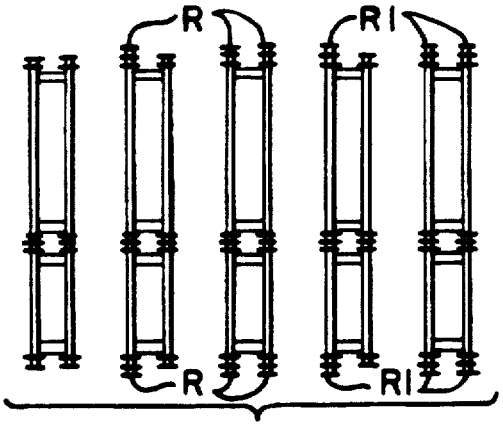
Figure 17:
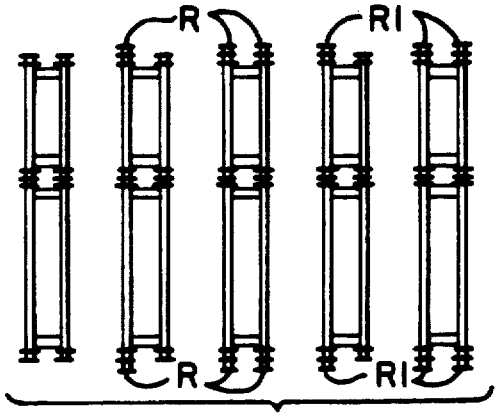

FIGS. 7 and 8 are diagrammatic elevations of bridge girders comprised of one and two storey trusses using variously unreinforced and reinforced type A panels only;

FIG. 9, analogous to FIGS. 7 and 8, shows the use of type B panels only in a single storey structure;

FIGS. 10 and 11 show the use of mixed type A, type B and gradient panels in a girder structure;

FIG. 12 shows the use of type B panels only in a two storey girder structure;

FIG. 13 illustrates typical sections on line 1 of FIG. 7;

FIG. 14 illustrates typical sections on line 2 of FIGS. 8 and 10;

FIG. 15 illustrates typical sections on line 3 of FIG. 9;

FIG. 16 illustrates typical sections on line 4 of FIG. 10;

FIG. 17 illustrates typical sections on line 5 of FIG. 11; and

Figure 18:
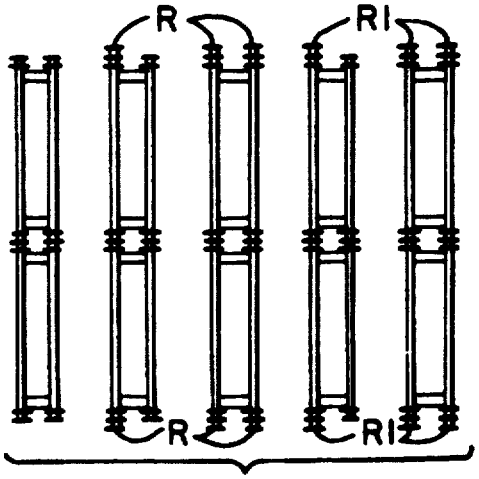

FIG. 18 illustrates typical sections on line 6 of FIGS. 11 and 12.

FIGS. 1 and 2 show two different panels A, B which are available for use as required in the construction of a lattice panel bridge of the kind already mentioned; both types A, B of panels having a generally rectangular configuration as shown in FIGS. 1 and 2 and the type B panel being 1½ times the depth of the type A panel.

The panels have the same number of component parts, the top and bottom chords being identical but those in Panel B are spaced further apart than those in Panel A by increasing the lengths of the inter-connecting vertical and diagonal members. These type B panels are compatible with the existing lattice bridge system, except when required to be fitted end to end with type A panels in which case transition panels are hereinafter described have to be used.

All panels may have upper and/or lower chord reinforcements of different strengths, R, R1 as indicated in the right hand parts of FIGS. 1A and 2A. As shown in FIGS. 1B and 2B, the upper and lower chord reinforcements may be respectively mounted to the top and bottom chords of the type A or type B panel.

FIGS. 1B and 2B indicate how Panels A and B, with or without chord reinforcements of various strengths R and R1 may be combined one upon another or superposed in various combinations to form two-story truss configurations with different bending strengths. These bending strengths, relative to the strength of panel Type A, are indicated in FIGS. 1A, 1B, 2A and 2B by the factors (1), (1.5), (2), (2.5), (3), (4), (5) and (6). These factors are for one particular chord strength and will be considerably increased in number with the introduction of chords of different strengths.

The transition panels C are of the same standard length and thickness as the panels A and B but increase in depth from end to end from the depth of a panel A to that of a panel B. As shown in FIGS. 3 and 4, the transition panels C also include top and bottom chords and members interconnecting the chords. The mode of use of these panels C in two differently constructed trusses will be apparent from FIGS. 5 and 6.

FIGS. 7 and 8, in conjunction with FIGS. 13 and 14, indicate how, by use of already known type A panels only, a practical maximum of 13 different one and two storey single and double truss configurations is possible using standard (R) or heavy R1, chord reinforcements.

In contrast, and surprisingly, by using type B panels only, or in combination with type A panels, no less than 46 different one and two storey single and double truss configuration can be obtained an increase of 370%. 23 such configurations some including transition panels T are shown in FIGS. 9 to 18. In FIGS. 13 to 18 heavy chord reinforcements (R1) are blocked in black squares.

If a third truss were to be added, the number of possible configurations from existing type A panels only is 27, the addition of type B panels would permit 102 configurations, an increase of about 350%.

In the system which uses type A and type B panels in combination all decking, chord reinforcements and other items are unchanged. The deeper panel however provides an intermediate strength factor between the standard panel in a single storey and in a double storey truss. Alternatively, the deeper panel may have chords formed of stronger members to produce yet another degree of strength.

The method of bridge erection using a launching nose is unchanged and all existing erection equipment is compatible.

The increased strength and stiffness of Panel B allows the bridge equipment to be used in its preferred single storey configuration (where no redundant chords exit on the neutral axis of the section) to a maximum simple span 50% greater than the equivalent bridge built with the existing type A panels.

Bridges built with Type B panels can accept a much deeper cross girder which enables wider roadways of 2 or 3 lanes to become possible without expensive details to reduce the end depth of the cross-girder.

The manufacturing cost of the deep panel B is only slightly more than the standard panel A owing to increased length of web members, but the top and bottom chord sub-assemblies which represent a large part of manufacturing cost remain identical.

As more than half the cost of this type of bridge is usually in the girders, utilising the panels in the ways which have been described effects substantial economies in their material cost and their construction.

What is claimed is:

1. A [lattice bridge] construction system *for a range of bridges* comprising lattice panels which are of substantially identical length [or fractions or multiples thereof] but of different depth relative to one another such that when variously combined with one another, with or without additional reinforcement, trusses having a range of incremental bending strengths in excess of those achievable by use of one size of panel only can be achieved, wherein the panels are of two or more different depths and [can be] *capable of being selectively* superposed one above the other.

2. A system in accordance with claim 1 including transition panels with ends of different depth corresponding to the respective depths of the two different height lattice panels.

3. A [lattice bridge] construction system *for a range of bridges* comprising first and second lattice panels wherein each lattice panel has a generally rectangular configuration, each lattice includes parallel top and bottom chord and members inter-connecting the top and bottom chord, one lattice panel [is superposable] *capable of being selectively superimposed* on another lattice panel, the first lattice panel has a depth different from the second lattice panel, the ends of the first lattice panels are connectable, and the ends of the second lattice panels are connectable.

4. The lattice bridge construction system in accordance with claim 3 further comprising a chord reinforcement mountable to the top or bottom cord of the first or second lattice panel.

5. The lattice bridge construction system in accordance with claim 3 further comprising a transition panel including top and bottom chord and members inter-connecting the top and bottom chord, one end of the transition panel having a depth substantially identical to the depth of the first panel and being connectable to an end of the first panel and the other end of the transition panel having a depth substantially identical to the depth of the second panel and being connectable to an end of the second panel.

6. The lattice bridge construction system in accordance with claim 3 wherein the first panel has a length substantially identical to the length of the second panel.

7. A [lattice bridge] construction system *for a range of bridges* comprising first and second lattice panels wherein the first lattice panel has a length identical to the length of the second lattice panel and has a depth different from the depth of the second lattice panel, wherein the ends of the first lattice panels are connectable and the ends of the second lattice panels are connectable and one lattice panel is superposable on another lattice panel, and wherein each lattice panel has a generally rectangular configuration and includes parallel top and bottom chord and members inter-connecting the top and bottom cords; a chord reinforcement mountable to the top or bottom cord of the first or second lattice panel; and a transition panel including top and bottom chord and members inter-connecting the top and bottom chord, one end of the transition panel having a depth substantially identical to the depth of the first panel and being connectable to an end of the first panel and the other end of the transition panel having a depth substantially identical to the depth of the second panel and being connectable to an end of the second panel.

8. The lattice bridge construction system in accordance with claim 7 including a plurality of chord reinforcements of different strengths.

9. The lattice bridge construction system in accordance with claim 8 wherein the first and second panels and the cord reinforcements are combinable to form configurations having bending strengths related to the strengths of the first panel by factors of 1, 1.5, 2, 2.5, 3, 4, 5, and 6.

*10. A system in accordance with claim 1 including a plurality of panels of different sizes sufficient to build at least one bridge with panels all of one size and at least a second bridge with panels all of a different size.*

* * * * *

UNITED STATES PATENT AND TRADEMARK OFFICE

CERTIFICATE OF CORRECTION

PATENT NO. : Re. 34,103

DATED : October 20, 1992

INVENTOR(S) : BEVIL G. MABEY AND DAVID G. MABEY

It is certified that error appears in the above-identified patent and that said Letters Patent is hereby corrected as shown below:

Column 2, line 17, delete "story" and substitute therefor -- storey --.

IN THE CLAIMS:

Column 4, line 17, after the word "is" delete "superposable" and insert -- capable of being selectively superposed --.

Signed and Sealed this

Fifth Day of October, 1993

Bruce Lehman

*Attest:*

BRUCE LEHMAN

*Attesting Officer*

*Commissioner of Patents and Trademarks*